US009930589B2

United States Patent
Virtej et al.

(10) Patent No.: US 9,930,589 B2
(45) Date of Patent: Mar. 27, 2018

(54) DETECTION AND RECOVERY FROM LOSS OF SMALL CELL CONNECTION

(71) Applicant: Nokia Technologies Oy, Espoo (FI)

(72) Inventors: Elena Virtej, Espoo (FI); Jari Lunden, Espoo (FI); Esa Malkamäki, Espoo (FI); Martti Moisio, Klaukkala (FI); Antti Sorri, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/911,655

(22) PCT Filed: Sep. 9, 2013

(86) PCT No.: PCT/FI2013/050864
§ 371 (c)(1),
(2) Date: Feb. 11, 2016

(87) PCT Pub. No.: WO2015/033015
PCT Pub. Date: Mar. 12, 2015

(65) Prior Publication Data
US 2016/0198374 A1    Jul. 7, 2016

(51) Int. Cl.
*H04W 36/04* (2009.01)
*H04W 16/32* (2009.01)
(Continued)

(52) U.S. Cl.
CPC .............. *H04W 36/04* (2013.01); *H04L 5/22* (2013.01); *H04W 16/32* (2013.01);
(Continued)

(58) Field of Classification Search
CPC .... H04L 5/22; H04W 16/32; H04W 36/0055; H04W 36/04; H04W 36/30; H04W 76/02;
(Continued)

(56) References Cited

U.S. PATENT DOCUMENTS

2004/0024883 A1* 2/2004 Hlasny ............... H04L 29/06
709/227
2010/0173626 A1  7/2010 Catovic et al.
(Continued)

FOREIGN PATENT DOCUMENTS

EP        2621214      7/2013
WO     2011100673     8/2011
(Continued)

OTHER PUBLICATIONS

International Search Report and Written Opinion received for corresponding Patent Cooperation Treaty Application No. PCT/FI2013/050864, dated Apr. 22, 2014, 16 pages.
(Continued)

*Primary Examiner* — Thai Vu
(74) *Attorney, Agent, or Firm* — Mintz Levin Cohn Ferris Glovsky and Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: establish connection with a first cell and a second cell, wherein the connection with the first cell and the second cell is configured in a time division multiplexing pattern; determine the connection with the second cell failed; and indicate to the first cell that the connection with the second cell has failed.

20 Claims, 5 Drawing Sheets

(51) Int. Cl.
*H04W 76/02* (2009.01)
*H04W 36/00* (2009.01)
*H04L 5/22* (2006.01)
*H04W 36/30* (2009.01)

(52) U.S. Cl.
CPC ....... *H04W 36/0055* (2013.01); *H04W 76/02* (2013.01); *H04W 76/025* (2013.01); *H04W 36/30* (2013.01)

(58) Field of Classification Search
CPC ... H04W 76/025; H04W 24/04; H04W 36/28; H04W 76/028
See application file for complete search history.

(56) References Cited

U.S. PATENT DOCUMENTS

| | | | |
|---|---|---|---|
| 2012/0082140 A1* | 4/2012 | Lin | H04W 72/1215 370/336 |
| 2012/0113847 A1 | 5/2012 | Narasimha et al. | |
| 2013/0183960 A1 | 7/2013 | Olofsson et al. | |
| 2013/0215875 A1* | 8/2013 | Yang | H04W 72/0446 370/336 |
| 2015/0365872 A1* | 12/2015 | Dudda | H04W 36/0055 455/436 |

FOREIGN PATENT DOCUMENTS

| | | |
|---|---|---|
| WO | 2013091161 | 6/2013 |
| WO | 2013104416 | 7/2013 |

OTHER PUBLICATIONS

3GPP TS 36.331 (V11.3.0 (Mar. 2013)): 3rd Generation Partnership Project; Technical Specification Group Radio Access Network; Evolved Universal Terrestrial Radio Access (E-UTRA); Radio resource control (RRC); Protocol specification (Release 11).
ETSI, "Evolved Universal Terrestrial Radio Access (E-UTRA); Physical layer procedures (3GPP TS 36.213 version 11.2.0 Release 11)", ETSI TS 136 213 V11.2.0, Apr. 2013.

* cited by examiner

FIG. 6

DETECTION AND RECOVERY FROM LOSS OF SMALL CELL CONNECTION

RELATED APPLICATION

This application was originally filed as PCT Application No. PCT/FI2013/050864 filed Sep. 9, 2013.

TECHNICAL FIELD

The present application relates to wireless communications and, in particular, detection and recovery from loss of small cell connection for a user equipment (UE) with dual connection with small cell and macro cell.

BACKGROUND

The expected increase in wireless data transmissions may mean that there will be a need to deploy more network capacity. One efficient way to increase the network capacity is by deploying small cells for offloading purposes or offloading cells in general. These small cells can be deployed on the same or separate carriers relative to the serving cell, and the mixed environment with macro/large cells and small cells are often referred to heterogeneous networks (hetnets). Use of hetnets may provide opportunities for offloading traffic from the macro cells to, for example, a higher speed or a higher capacity small cell.

The heterogeneous network may include one or more wireless access points, or base stations, such as for example an E-UTRAN (evolved Universal Mobile Telecommunications System Terrestrial Radio Access Network) NodeB base station serving macro cells, and one or more small cell base stations serving small cells. For example, a small cell base station (or a wireless access point or a remote radio head, for example) may be implemented to cover a small cell, or coverage area, examples of which include a residence, a small business, a building, an office, or a small area. The small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less/smaller coverage/range and lower power capabilities given its limited coverage area or class. Furthermore, small cell base station may have limited (or non-ideal) backhaul connection that may have higher latency or lower throughput than macro cell base stations. This limited backhaul connection may affect communication between small cell base station and other base stations and other network elements or nodes. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. The small cell base station may be implemented as a secondary base station, for example, a secondary cell (SCell) eNB in carrier aggregation. It may also be called a secondary eNB (SeNB). Accordingly, wireless service providers view small cell base stations as a way to extend service coverage into a small cell, as a way to offload traffic to the small cell base stations, and/or as a way to provide enhanced service, such as for example higher data rates, lower latencies, energy efficiency and the like, within the small cell, when compared to the larger macro cell served by a typical base station, such as for example the eNB base station. The macro cell base station may be also implemented as a primary base station, for example, a primary cell (PCell) eNB in carrier aggregation and may also be called master eNB (MeNB).

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: establish connection with a first cell and a second cell, wherein the connection with the first cell and the second cell is configured in a time division multiplexing pattern; determine the connection with the second cell failed; and indicate to the first cell that the connection with the second cell has failed.

According to a second aspect of the present invention, a method comprising: establishing connection with a first cell and a second cell, wherein the connection with the first cell and the second cell is configured in a time division multiplexing pattern; determining the connection with the second cell failed; and indicating to the first cell that the connection with the second cell has failed.

According to a third aspect of the present invention, a computer program product comprising a computer-readable medium bearing computer program code embodied therein for use with a computer, the computer program code comprising: code for establishing connection with a first cell and a second cell, wherein the connection with the first cell and the second cell is configured in a time division multiplexing pattern; code for determining the connection with the second cell failed; and code for indicating to the first cell that the connection with the second cell has failed.

According to a fourth aspect of the present invention, an apparatus comprising: at least one processor; and at least one memory including computer program code, wherein the at least one memory and the computer program code are configured to, with the at least one processor, cause the apparatus to perform at least the following: establish connection with a user equipment, wherein the user equipment has connection with a second base station and the connection with the apparatus and the second base station is configured in a time division multiplexing pattern; receive indication from the user equipment that the connection with the second base station has failed; and reconfigure the time division multiplexing pattern for the user equipment.

According to a fifth aspect of the present invention, an apparatus comprising: means for establishing connection with a first cell and a second cell, wherein the connection with the first cell and the second cell is configured in a time division multiplexing pattern; means for determining the connection with the second cell failed; and means for indicating to the first cell that the connection with the second cell has failed.

According to a sixth aspect of the present invention, an apparatus comprising: means for establishing connection with a user equipment, wherein the user equipment has connection with a second base station and the connection with the apparatus and the second base station is configured in a time division multiplexing pattern; means for receiving indication from the user equipment that the connection with the second base station has failed; and means for reconfiguring the time division multiplexing pattern for the user equipment.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Dual connectivity refers to the scenario that a UE is connected simultaneously to two different base stations, for example, one macro cell base station and one small cell base station. In an example embodiment, UE receives from only one of the macro and small cell at a time, for example, when UE has single radio frequency (RF) chain and UE uses a time division multiplexing (TDM) type of solution to achieve dual connectivity. UE may be logically connected simultaneously to two cells, but physically receiving or transmitting from/to only one of the cells at the time. In the example embodiment, when the small cell connection (or link) fails, it may be necessary or beneficial to detect the loss quickly and resume connection with the macro cell. In the TDM type of solution, UE may listen to macro and small cell according to a known TDM pattern. For example, UE communicates 500 ms with the small cell, then 20 ms with macro cell and then again 500 ms with small cell and so on. Other TDM patterns with different time periods may be used as well. When the small cell connection fails while the UE is still being served by the small cell, it may be necessary for the UE to detect connection loss quickly and resume connection with macro cell without waiting for next opportunity for macro cell communication according to the known TDM pattern.

The subject matter disclosed herein provides a way for UE with dual connectivity to macro and small cell to detect connection loss of the small cell and recover from the connection loss by resuming connection to the macro cell. Specifically, there is provided a way of detecting connection loss of the small cell with some trigger events and reporting the connection loss to the macro cell when the UE has detected one or more the trigger events—thus allowing the macro cell to resume connection with the UE.

Figure 1:
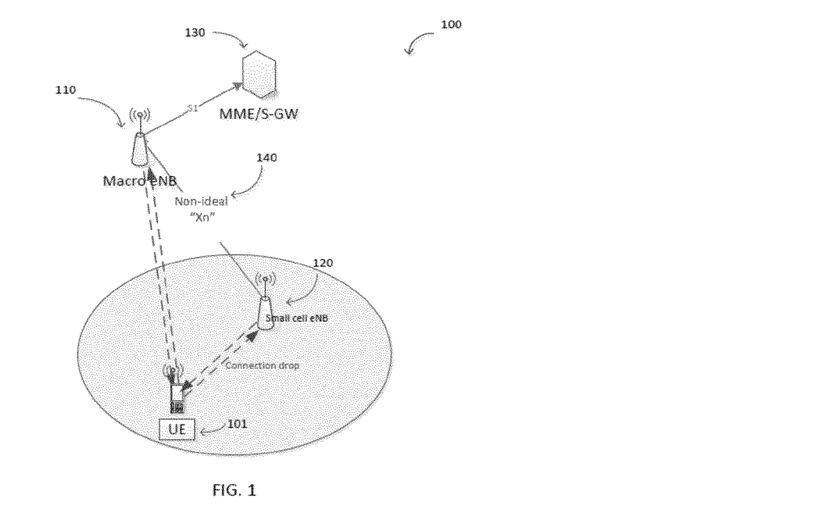
FIG. 1 depicts an example of a heterogeneous network in which some embodiments of the present invention may be practiced.

FIG. 1 illustrates an example heterogeneous network 100 in which some example embodiments of the present invention may be practiced. As illustrated in FIG. 1, in the heterogeneous network 100, a UE 101 is in connection with a macro eNB 110 and a small cell eNB 120. The UE 101 may be in a dual connectivity mode, that is, UE is connected simultaneously to both macro eNB 110 and small cell eNB 120. The coverage area of the small cell eNB 120 is depicted by the ellipse, wherein the coverage area of the macro cell eNB 110 is much larger than that of the small cell eNB and overlays the coverage area of the small cell eNB. Within the same coverage area of the macro cell eNB 110, UE's movement among small cells may lead to handover or reselection among small cells. The macro cell eNB may be in connection with the small cell eNB via an open interface 140, for example X2, Xn interface, or the like. This interface may be non-ideal, for example, having latency above 1 ms and even up to 60 ms or more, which may introduce significant delay in communication between macro cell eNB and small cell eNB. The macro cell eNB may be in connection with core network, for example, mobility management entity (MME) and serving gateway (S-GW) 130, via S1 interface. In some other example embodiments the small cell eNB may be directly in connection with core network.

Although FIG. 1 depicts a certain quantity of user equipment, base stations, and cells including small cell and macro cell, other quantities and configurations may be used as well. Additional connections or interfaces may also be present, for example, between small cell base station and the core network. It is noted that the term of macro cell and small cell has been and will be hereinafter described for purposes of example, the same cell type may be used according to the present invention. For example, one cell may be a master cell served by MeNB and the other cell may be an assisting cell served by SeNB.

Figure 2:
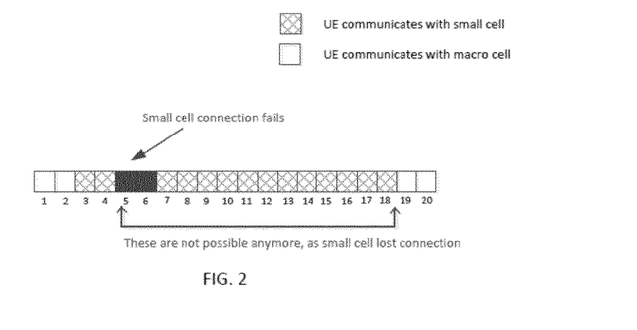
FIG. 2 illustrated an example of TDM pattern for macro cell and small cell communication in accordance with some embodiments of the invention.

FIG. 2 illustrates an example of TDM pattern for macro cell and small cell communication in accordance with some example embodiments of the invention. As illustrated in FIG. 2, according to the TDM pattern UE communicates the first two time slots (e.g. subframes) with macro cell, then 16 time slots from slot 3 to slot 18 with small cell and then again two time slots from slot 19 to slot 20 with macro cell. This pattern may be periodic and configured by the network. The connection with small cell may fail while UE is still being served by the small cell, for example, in FIG. 2 the connection with small cell fails at time slot 5. When the connection with small cell fails, the rest of time slots configured for small cell communication, for example, slots 6-18 in FIG. 2, may not be possible anymore. And according to the configured TDM pattern, the next opportunity for connection with macro cell is time slot 19. Therefore it may be necessary for UE to detect the connection loss quickly and resume connection with macro cell without waiting for next opportunity for macro cell communication according to the configured TDM pattern. This may avoid unnecessary delay due to UE waiting for the next opportunity according to the TDM pattern before attempting to communicate with the macro cell base station. The TDM pattern of this example should not be seen as restrictive, other patterns may be used as well.

Figure 3:
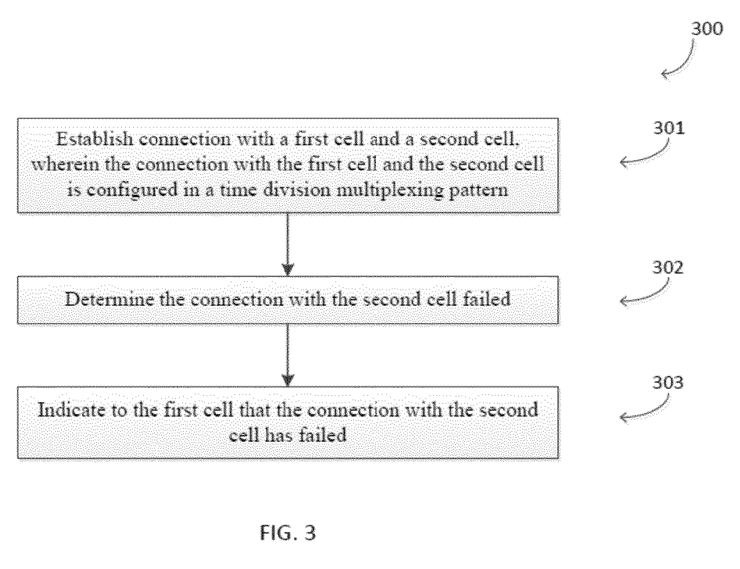
FIG. 3 depicts an example process for detection and recovery from loss of small cell connection in a heterogeneous network in accordance with some example embodiments of the invention.

FIG. 3 is a flow chart illustrating an example process for detection and recovery from loss of small cell connection in a heterogeneous network in accordance with some example embodiments of the invention. Example process 300 may be performed by or in an apparatus, such as the user equipment 101 of FIG. 1.

At 301, the apparatus establishes connection with a macro cell eNB and a small cell eNB, for example, the macro cell eNB 110 and the small cell eNB 120 of FIG. 1. In an example embodiment, the connection with the macro cell and the small cell may be configured in a TDM pattern, for example, the TDM pattern as illustrated in FIG. 2.

At 302, the apparatus determines the connection with the small cell failed or becomes very poor. In an example embodiment, the apparatus determines the connection with the small cell failed when the apparatus detects that N consecutive channel state information measure below a threshold, or M out of N channel state information measure below a threshold, where M and N are both integer number and M is less than or equal to N. The channel state information measure may be related to short term link performance, for example, channel quality indication (CQI). Reference can be made to 3GPP TS 36.213 V11.2.0 (2013-02) 3rd Generation Partnership Project; Technical Specification Group Radio Access Network; Evolved Universal Terrestrial Radio Access (E-UTRA); Physical layer procedures (Release 11). Table 1 is an example of CQI table from the reference. The threshold value may be chosen from the CQI index, for example, CQI index=1. In the example, the apparatus determines the connection with the small cell has failed when the apparatus detects N consecutive CQI index of 0, which is "out of range" as shown in Table 1.

TABLE 1

An example of CQI table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In another example embodiment, the apparatus determines the connection with the small cell failed when the apparatus detects that N consecutive packet reception failed, or M out of N packet reception failed, where M and N are both integer number and M is less than or equal to N. A packet reception may be failed, for example, when receiver does not decode the packet correctly, for example, the cyclic redundancy check (CRC) failed.

In yet another example embodiment, the apparatus determines the connection with the small cell failed when the apparatus detects N consecutive packet transmission attempt has failed, or M out of N packet transmission has failed, where M and N are both integer number and M is less than or equal to N. A packet transmission may be failed, for example, when the apparatus does not receive successful acknowledgement from the network for the transmitted packet, or when the apparatus does not get the data packet successfully transmitted within certain time, for example, within certain milliseconds or subframes.

In a further example embodiment, the apparatus determines the connection with the small cell failed when the apparatus detects N consecutive out-of-sync indications. Reference can be made to 3GPP TS 36.213 V11.2.0 (2013-02) 3rd Generation Partnership Project; Technical Specification Group Radio Access Network; Evolved Universal Terrestrial Radio Access (E-UTRA); Physical layer procedures (Release 11). In the reference, the physical layer in the UE in every radio frame or at least once every DRX period assesses the radio link quality, depending on whether the UE is in non-DRX or DRX mode. The radio link quality is evaluated over previous time period and against thresholds (Qout and Qin). The physical layer indicates out-of-sync to higher layers when the radio link quality is worse than the threshold Qout. When the radio link quality is better than the threshold Qin, the physical layer in the UE indicates in-sync to higher layers. In some example embodiments, the apparatus performs radio link monitoring (RLM) of small cell, even though it is not a primary cell (PCell).

The apparatus may perform RLM of small cell when it is configured to or when one or more conditions are met. In an example embodiment, the apparatus performs RLM of small cell when the apparatus is having a delay sensitive service or a service which does not allow longer service break, for example, voice over IP (VoIP) service. In another example embodiment, the apparatus performs RLM of small cell when the signal quality or level of the small cell has dropped below a certain threshold, which may be an indication that the connection with small cell is likely to fail. In yet another example embodiment, the apparatus performs RLM of small cell when the apparatus has set the power preference indicator, PowerPrefIndication, to normal. Reference can be made to 3GPP TS 36.331 V11.3.0 (2013-03) 3rd Generation Partnership Project; Technical Specification Group Radio Access Network; Evolved Universal Terrestrial Radio Access (E-UTRA); Radio resource control (RRC); Protocol specification (Release 11). In the reference, PowerPrefIndication set to normal applies to the scenario that the apparatus does not prefer a configuration primarily optimised for power saving, which may indirectly means the apparatus may have a delay sensitive service. In yet another example embodiment, the apparatus performs RLM of small cell when the apparatus is of high speed, for example, the apparatus has high mobility state estimation (MSE). The apparatus may perform RLM of small cell when the apparatus is of high speed and the current signal level/quality is low. If the signal quality is high and the UE is stationary, it is likely that the loss probability is very low and there is no need for frequent monitoring. In a further example embodiment, the apparatus performs RLM of small cell when there are no other small cells for the apparatus to handover or re-select to, for example, there is no overlapping small cell coverage for the apparatus. In this case, there are no backup small cells and the loss of connection with small cell may result in loss of service.

At 303, the apparatus indicates to the macro cell that the connection with the small cell has failed. In an example embodiment, the apparatus indicates to the macro cell (or master eNB) that the connection with the small cell (or secondary eNB) has failed via a radio resource control (RRC) message. In another example embodiment, the apparatus indicates to the macro cell that the connection with the small cell has failed via a medium access control (MAC) message. In yet another example embodiment, the apparatus indicates to the macro cell that the connection with the small cell has failed using a random access channel (RACH). RRC and MAC signaling require typically that RACH is used, unless dedicated scheduling request (SR) resource on physical uplink control channel (PUCCH) is configured. In a further example embodiment, the apparatus indicates to the macro cell that the connection with the small cell has failed using a dedicated resource on PUCCH configured by the macro cell eNB. The PUCCH resource may be configured only on certain slots (e.g. subframes) so that the apparatus may need to wait until next such opportunity.

In an example embodiment, the apparatus may break the configured TDM pattern by stopping communicating with the small cell after determining the connection with small cell has failed. For example, the apparatus may stop monitoring PDCCH of the small cell, stop transmitting scheduling request and CQI to the small cell.

In an alternative embodiment, the apparatus may send an indication of the small cell failure without breaking the TDM pattern and then it is up to the macro cell eNB to take action when necessary. Network may for example reconfigure the TDM pattern of the apparatus.

In an example embodiment, the apparatus may resume connection with the macro cell without waiting for the next opportunity for connection with macro cell according to a configured TDM pattern. Referring to the example in FIG. 2, the apparatus may resume connection with the macro cell without waiting for slot 19, which is next opportunity for connection with macro cell according to the example TDM pattern. Instead, the apparatus may resume connection with the macro cell among slots 6-18, which was configured for small cell communication, after detecting connection loss with the small cell at slot 5. The apparatus may resume connection with the macro cell by, for example, monitoring a downlink channel such as physical downlink control channel (PDCCH). This may be achieved so that after the apparatus has indicated the macro cell that the small cell connection (or link) has failed, the macro cell reconfigures the TDM pattern, or configures the apparatus to stop monitoring the small cell, or starts scheduling the apparatus so that according to the DRX rules the apparatus needs to monitor PDCCH of the macro cell.

Figure 4:
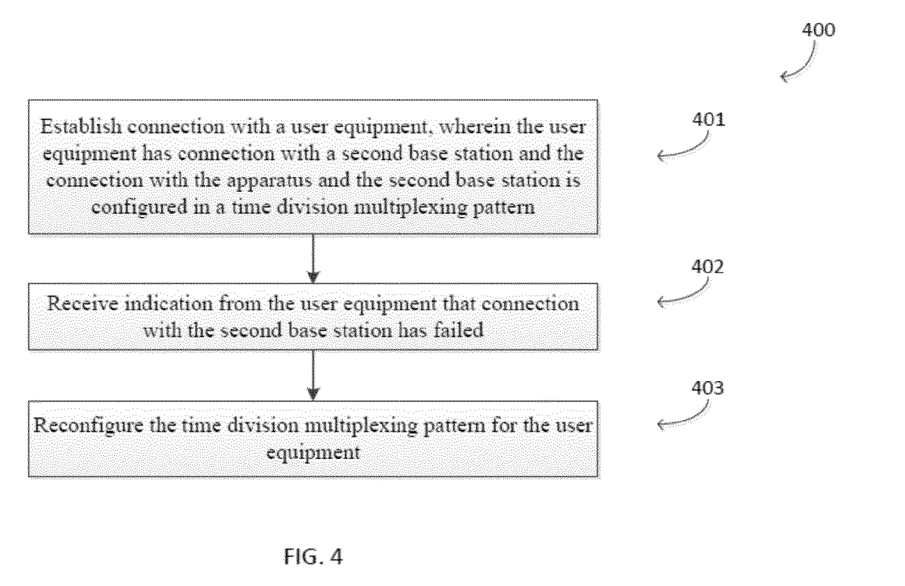
FIG. 4 depicts another example process for detection and recovery from loss of small cell connection in a heterogeneous network in accordance with some example embodiments of the invention.

FIG. 4 is a flow chart illustrating another example process for detection and recovery from loss of small cell connection in a heterogeneous network in accordance with some example embodiments of the invention. Example process 400 may be performed by or in an apparatus, such as the macro cell eNB 110 of FIG. 1.

At 401, the apparatus establishes connection with a user equipment, wherein the user equipment has connection with a small cell eNB and the connection with the apparatus and the small cell eNB is configured in a TDM pattern. For example, the TDM pattern as illustrated in FIG. 2.

At 402, the apparatus receives an indication from the user equipment that the connection with the small cell has failed. The indication from the user equipment may be received using the example embodiments provided for FIG. 3.

At 403, the apparatus reconfigures the TDM pattern for the user equipment. For example, the apparatus may configure longer period for macro cell connection, or the apparatus may not configure time slots for small cell connection until the apparatus receives further indication that the small cell connection is recovered, for example, based on measurement reports from the UE. The apparatus and the small cell eNB may have signaling via backhaul, for example, the interface 140 in FIG. 1, to indicate to the small cell eNB that the user has gone outside the coverage area of the small cell, or that the connection between small cell eNB and the user equipment has failed, or that user equipment is no longer attached to the small cell eNB and is now served by the apparatus. The apparatus may further configure one or more bearers with the user equipment if bearer switching is needed. The apparatus may start serving the user equipment by assigning dedicated radio resources through PDCCH.

Figure 5:
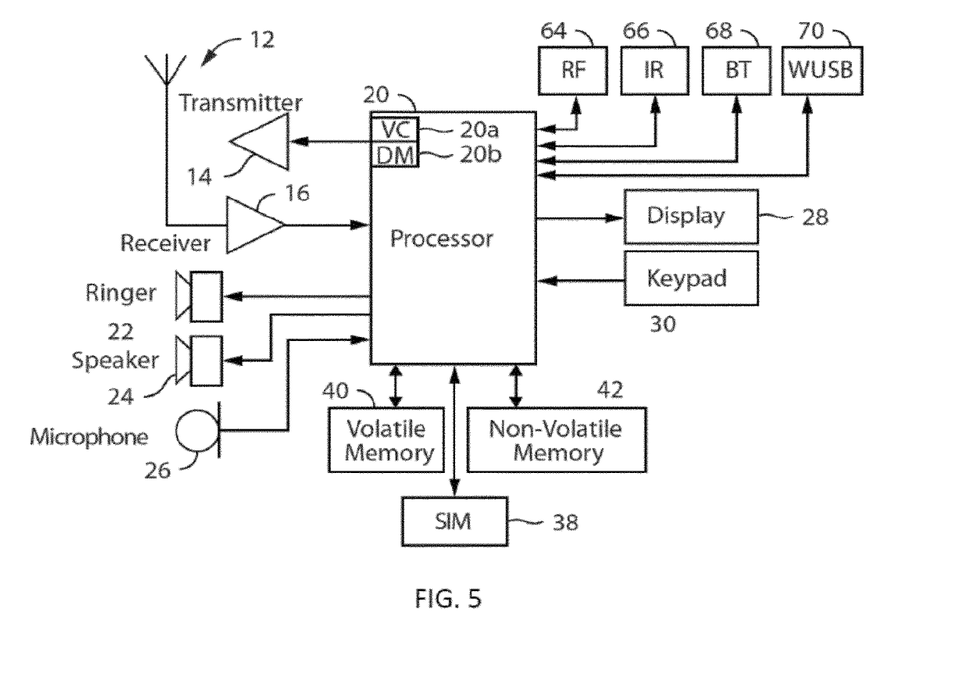
FIG. 5 illustrates a block diagram of a user equipment in accordance with some embodiments of the invention.

FIG. 5 illustrates a block diagram of an apparatus 10, which can be configured as user equipment, such as 101 of FIG. 1, in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 5, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise a non-transitory memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

Figure 6:
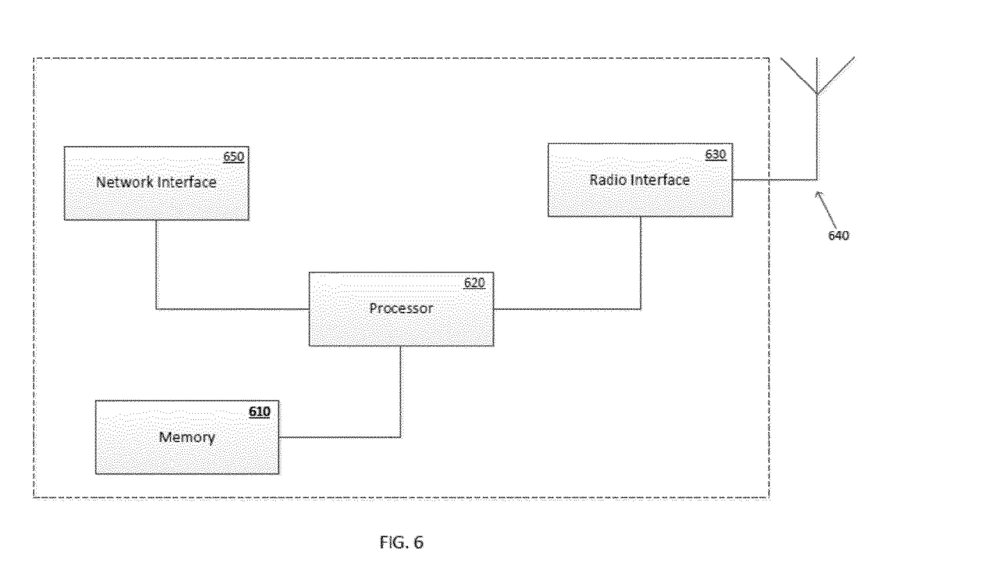
FIG. 6 illustrates a block diagram of a base station in accordance with some embodiments of the invention.

FIG. 6 depicts an example implementation of a base station in accordance with some embodiments of the invention, such as the macro cell base station eNB 110. The base station may include one or more antennas 640 configured to transmit via a downlink and configured to receive uplinks via the antenna(s). The base station may further include a plurality of radio interfaces 630 coupled to the antenna 640. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 630 may further include other components, such as filters, converters (for example, digital-to-analog converters and the like), mappers, a Fast Fourier Transform (FFT) module, and the like, to generate symbols for a transmission via one or more downlinks and to receive symbols (for example, via an uplink). The base station may further include one or more network interfaces 650, such as interface 140 in FIG. 1, for receiving and transmitting to other base stations. The base station may further include one or more processors, such as processor 620, for controlling the interfaces 630 and 650 and for accessing and executing program code stored in memory 610. In some example embodiments, the memory 610 includes code, which when executed by at least one processor causes one or more of the operations described herein with respect to a base station.

Without in any way limiting the scope, interpretation, or application of the claims appearing below, a technical effect of one or more of the example embodiments disclosed herein may include detection and recovery from loss of small cell connection for a user equipment with dual connection with small cell and macro cell. It should be noted that the loss of small cell connection or that connection to small cell fails in this invention may mean that the signal quality goes below some threshold, for example, some communication may still be possible after that but e.g., the data rates may be too low.

Embodiments of the present invention may be implemented in software, hardware, application logic or a combination of software, hardware and application logic. The software, application logic and/or hardware may reside on a non-transitory memory 40 and/or 42, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable non-transitory storage medium that may be any media or means that can contain or store the instructions for use by or in connection with an instruction execution system, apparatus, or device, such as a computer. The scope of the present invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on".

What is claimed is:

1. A method comprising:
   establishing, by an apparatus, a first connection with a first cell and a second connection with a second cell, the first connection and the second connection configured according to a time division multiplexing pattern, the time division multiplexing pattern comprising first time slots allocated for communicating over the first connection and second time slots allocated for communicating over the second connection;
   determining, by the apparatus and during the second time slots, that the second connection failed;
   transmitting, by the apparatus and during the second time slots, an indication to the first cell that the second connection failed; and
   resuming communication, by the apparatus and after transmitting the indication that the second connection failed, with the first cell during a remaining portion of the second time slots reconfigured for communicating over the first connection, the remaining portion of the second time slots previously allocated for communicating over the second connection, and the remaining portion of the second time slots occurring before a next occurrence of a time slot from the first time slots.

2. The method of claim 1, wherein the first cell is a macro cell or served by a master base station and the second cell is a small cell or served by a secondary base station.

3. The method of claim 2, further comprising:
   performing radio link monitoring of the second cell if at least one of the conditions are met:
   the apparatus having a delay sensitive service,
   link level quality with the second cell decreased below a threshold,
   PowerPrefIndication field is set to normal, and
   there is no other small cell to handover or re-select to,
   wherein determining the second connection with the second cell failed is based on the radio link monitoring.

4. The method of claim 1, wherein determining the second connection with the second cell failed comprises detection of at least one of the events:
   N consecutive channel state information measure below a threshold,
   M out of N channel state information measure below a threshold,
   N consecutive packet reception failed,
   M out of N packet reception failed, and
   N consecutive of out-of-sync indications, wherein M and N are integers and M is less than N.

5. The method of claim 1, further comprising:
   stopping communication, during the second time slots allocated for communicating over the second connection, with the second cell in order to indicate to the first cell that the second connection with the second cell failed.

6. The method of claim 1, wherein indicating to the first cell that the second connection with the second cell failed uses at least one of:
   radio resource control signaling,
   medium access control signaling, and
   random access channel.

7. The method of claim 1, wherein the first time slots comprise a first repeating pattern of time slots spanning a first duration, wherein the second time slots comprise a second repeating pattern of time slots spanning a second duration, and wherein the first duration is shorter than the second duration.

8. The method of claim 7, wherein resuming communication with the first cell comprises resuming connection without waiting for a beginning of a next occurrence of the first repeating pattern according to the configured time division multiplexing pattern.

9. The method of claim 7, wherein resuming communication with the first cell comprises monitoring a physical downlink control channel of the first cell for a new time division multiplexing pattern and communicating with the first cell according to the new time division multiplexing pattern.

10. An apparatus, comprising:
at least one processor; and
at least one memory including computer program code, wherein the at least one memory and the computer program code are configured to, with the at least one processor, cause the apparatus to at least:
establish a first connection with a first cell and a second connection with a second cell, the first connection and the second connection configured according to a time division multiplexing pattern, the time division multiplexing pattern comprising first time slots allocated for communicating over the first connection and second time slots allocated for communicating over the second connection;
determine, during the second time slots, that the second connection failed;
transmit, during the second time slots, an indication to the first cell that the second connection failed; and
resume communication, after transmission of the indication that the second connection failed, with the first cell during a remaining portion of the second time slots reconfigured for communicating over the first connection, the remaining portion of the second time slots previously allocated for communicating over the second connection, and the remaining portion of the second time slots occurring before a next occurrence of a time slot from the first time slots.

11. The apparatus of claim 10, wherein the first cell is a macro cell or served by a master base station and the second cell is a small cell or served by a secondary base station.

12. The apparatus of claim 11, wherein the apparatus is further caused to at least:
perform radio link monitoring of the second cell if at least one of the conditions are met:
the apparatus having a delay sensitive service,
link level quality with the second cell decreased below a threshold,
PowerPrefIndication field is set to normal, and
there is no other small cell to handover or re-select to,
wherein the second connection with the second cell is determined to have failed based on the radio link monitoring.

13. The apparatus of claim 10, wherein determining the second connection with the second cell failed comprises detection of at least one of the events:
N consecutive channel state information measure below a threshold,
M out of N channel state information measure below a threshold,
N consecutive packet reception failed,
M out of N packet reception failed, and
N consecutive of out-of-sync indications, wherein M and N are integers and M is less than N.

14. The apparatus of claim 10, wherein the apparatus is further caused to at least:
stop communication, during the second time slots allocated for communicating over the second connection, with the second cell in order to indicate to the first cell that the second connection with the second cell failed.

15. The apparatus of claim 10, wherein indicating to the first cell that the second connection with the second cell failed uses at least one of:
radio resource control signaling,
medium access control signaling, and
random access channel.

16. The apparatus of claim 10, wherein the first time slots comprise a first repeating pattern of time slots spanning a first duration, wherein the second time slots comprise a second repeating pattern of time slots spanning a second duration, and wherein the first duration is shorter than the second duration.

17. The apparatus of claim 16, wherein resuming communication with the first cell comprises resuming connection without waiting for a beginning of a next occurrence of the first repeating pattern according to the configured time division multiplexing pattern.

18. The apparatus of claim 16, wherein resuming communication with the first cell comprises monitoring a physical downlink control channel of the first cell for a new time division multiplexing pattern and communicating with the first cell according to the new time division multiplexing pattern.

19. A method, comprising:
establishing, at a first base station, a first connection with a user equipment, wherein the user equipment establishes a second connection with a second base station;
configuring, via the first base station, the first connection and the second connection according to a time division multiplexing pattern, the time division multiplexing pattern comprising first time slots allocated for communicating over the first connection and second time slots allocated for communicating over the second connection;
receiving, at the first base station and during the second time slots, an indication from the user equipment that the second connection failed;
reconfiguring, via the first base station and in response to receiving the indication that the second connection failed, the first connection to include a remaining portion of the second time slots previously allocated for communicating over the second connection, the remaining portion of the second time slots occurring before a next occurrence of a time slot from the first time slots; and
resuming communication, by the first base station and after reconfiguring the first connection to include the second time slots previously allocated for communicating over the second connection, with the user equipment during the remaining portion of the second time slots.

20. The method of claim 19, wherein the second base station is a small cell base station or a secondary base station.

* * * * *